H. R. FARNSWORTH & T. H. SAVERY, Jr.
SUCTION ROLL.
APPLICATION FILED JUNE 18, 1915.

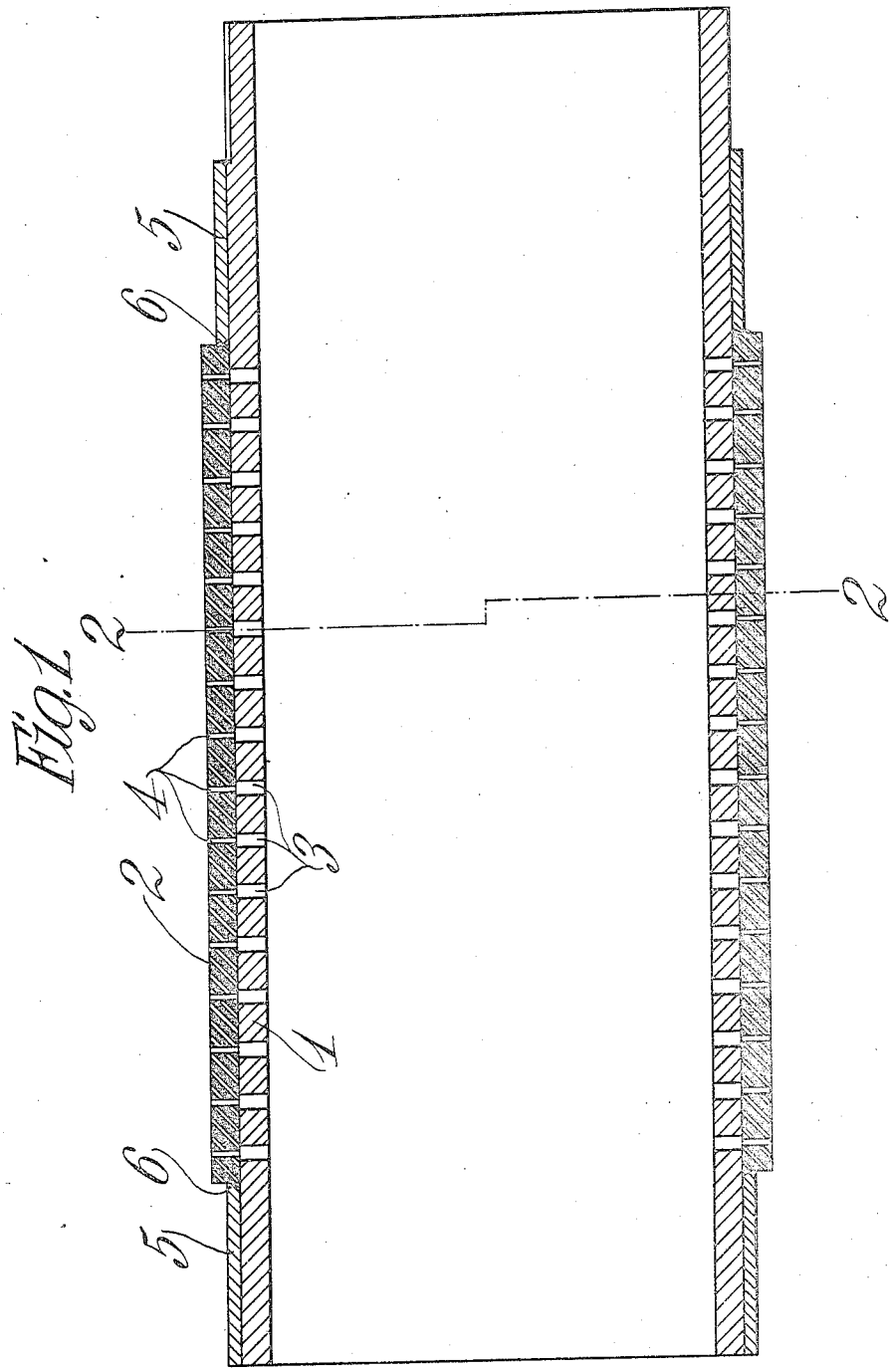

1,175,940.

Patented Mar. 21, 1916.
2 SHEETS—SHEET 2.

WITNESS
H. E. Hartwell

INVENTORS
Hiland R. Farnsworth and
Thomas H. Savery, Jr.
BY
Chapin & Co.
ATTORNEYS.

UNITED STATES PATENT OFFICE.

HILAND R. FARNSWORTH AND THOMAS H. SAVERY, JR., OF SANDUSKY, OHIO.

SUCTION-ROLL.

1,175,940.　　　　　Specification of Letters Patent.　　Patented Mar. 21, 1916.

Application filed June 18, 1915. Serial No. 34,857.

*To all whom it may concern:*

Be it known that we, HILAND R. FARNSWORTH and THOMAS H. SAVERY, Jr., citizens of the United States of America, residing in the city of Sandusky, county of Erie, and State of Ohio, have invented certain new and useful Improvements in Suction-Rolls, of which the following is a specification.

This invention relates to improvements in suction rolls as used in the manufacture of paper, in which the outer surface of the roll is covered with rubber; and the objects of our invention are, first, to provide a roll that will be efficient in operation, inexpensive to manufacture; second, to afford facilities for the proper extraction of the water from the paper pulp, and third, to lessen the wear upon the ordinary Fourdrinier wire or felt which is used in paper making machines.

The invention, therefore, comprises a suction roll that is covered with a suitable material for preventing the wear of the Fourdrinier wire or other material passing thereover.

Figure 3:
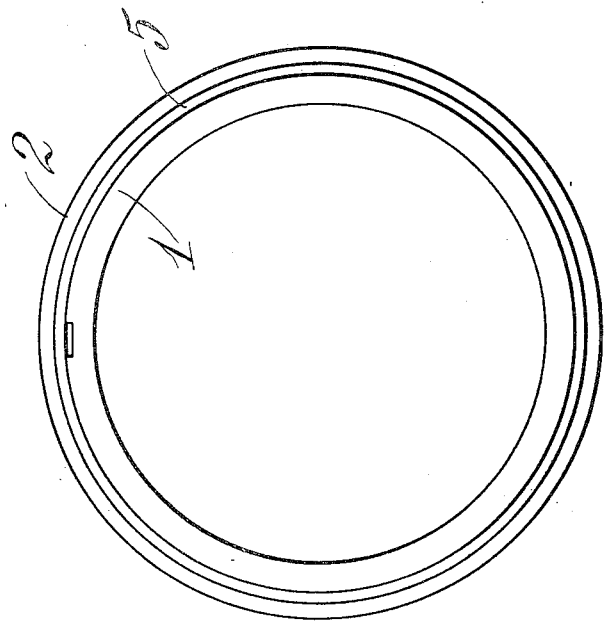
Figure 2:
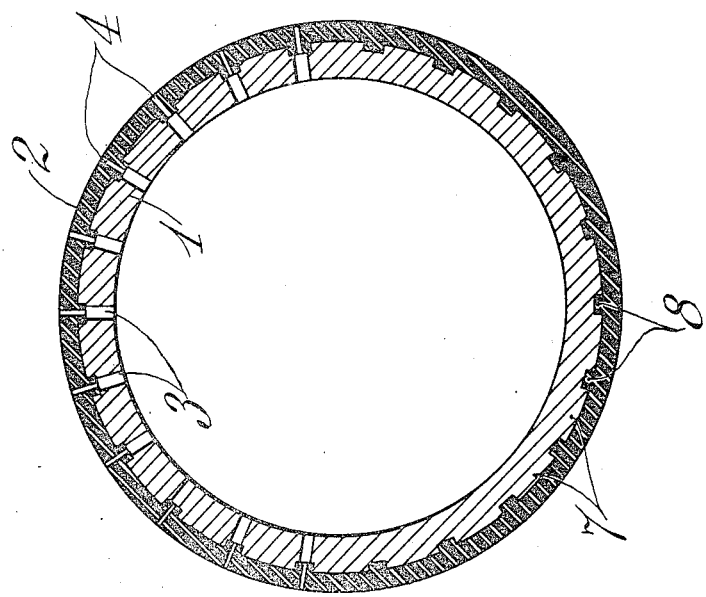

Referring to the drawings: Figure 1 is a longitudinal sectional view through the axis of the roll, showing the metal and rubber part of the roll in section, also illustrating the registering perforations through these two members of the roll; Fig. 2 is a transverse sectional view on the line 2—2 of Fig. 1, showing the manner of attaching the rubber to the metal part of the roll, and Fig. 3 is an end view of Fig. 1.

Referring to the drawings in detail: the metal part or shell of the roll is indicated at 1 and the rubber covered part is indicated at 2. These two parts or members of the roll are perforated, as shown at 3 and 4, the perforations 4 being slightly smaller than perforations 3. In order to hold the rubber part 2 in place, clamping rings 5 are secured to the cylinder 1 by shrinking or otherwise. These rings are formed with a sharp edge 6 in order to rigidly grip and retain the rubber part in place. The metal part of the cylinder 1 has formed on its outer surface the projections 7′, whereby when the rubber is molded on to the metal shell the tongues or ribs 8 will enter the corresponding shaped grooves in the metal, thus preventing any relative movement between the rubber and the metal. The roll is designed to be used in the ordinary paper making machine over which the Fourdrinier wire or felt travels. This invention, therefore, materially lessens the wear of the Fourdrinier wire which is very expensive to make and keep in repair.

What we claim is:

1. A suction roll, the metal shell portion of which is covered with rubber, registering perforations through the rubber and the metal shell, means for securing the rubber to the shell, comprising projections spaced from each other and forming grooves in the periphery in the outer surface of the shell, whereby when the rubber is molded to the shell it will be secured in place.

2. A suction roll comprising a shell and a covering therefor, the covering and shell having registering openings, means for retaining the covering against endwise movement and means comprising inter-engaging grooves between the shell and covering, as described.

3. A suction roll comprising a shell and a rubber covering secured to the outer surface of the same, means comprising inter-engaging projections and grooves between the shell and rubber-covering for retaining the shell and rubber-covering for retaining said covering in place, and means for preventing relative axial movement between the shell and the rubber covering about the axis of the shell, as described.

HILAND R. FARNSWORTH.
THOMAS H. SAVERY, Jr.